United States Patent [19]
Porkert et al.

[11] Patent Number: 5,894,010
[45] Date of Patent: Apr. 13, 1999

[54] OPTIMIZED GRAY CAST IRON PLATE ALLOY FOR UTILITY VEHICLE BRAKE DISKS

[75] Inventors: Joachim Porkert, Kirchheim; Wolfgang Lotz, Fellbach, both of Germany

[73] Assignee: Mercedes-Benz AG, Germany

[21] Appl. No.: 08/760,642

[22] Filed: Dec. 4, 1996

[30] Foreign Application Priority Data

Dec. 7, 1995 [DE] Germany .............................. 19545611

[51] Int. Cl.$^6$ .................................................. C22C 37/06
[52] U.S. Cl. ................................................. 420/15; 148/321
[58] Field of Search ......................... 148/321; 420/15, 420/16, 17

[56] References Cited

U.S. PATENT DOCUMENTS

5,032,194  7/1991  Metzler ................................... 420/15

FOREIGN PATENT DOCUMENTS

| 0 080 590 A2 | 12/1981 | European Pat. Off. . |
| 0 279 300 A2 | 2/1988 | European Pat. Off. . |
| 2 274 703 | 5/1975 | France . |
| 60-248864 | 12/1985 | Japan ................................... 420/15 |
| WO 94/10354 | 5/1994 | WIPO . |

OTHER PUBLICATIONS

Patent Abstract—Japanese Document 60-248864 May 28, 1990.

Patent Abstract—Japanese Document 02-138438 Dec. 9, 1985.

Patent Abstract—Japanese Document 6-57366 Jun. 6, 1994.

Pressure Density of Cast Iron With Layered Graphite, Cast Iron With Vermicular Graphite And Cast Iron With Particulate Graphite, E. Brunhuber, Giesserei–Praxis, May 10, 1982, pp. 135–138.

Not Sensitive to Thermal Cracking, H. Werning, Industrie–Anzeiger 22/1991; two pages.

*Primary Examiner*—Deborah Yee
*Attorney, Agent, or Firm*—Evenson, McKeown, Edwards & Lenahan, P.L.L.C.

[57] ABSTRACT

An alloy for a gray cast iron plate for casting blanks of brake disks has composition of 3.65 to 3.95%, preferably approximately 3.85% carbon; 0.20 to 0.40%, preferably approximately 0.30% chromium; 1.80 to 2.20% silicon; 0.60 to 0.80% manganese; 0.30 to 0.50% copper; 0.20 to 0.80%, preferably approximately 0.38 to 0.45% niobium, and the remainder of iron, traces of other alloy metals and melting-caused impurities, such as phosphorus or sulfur, in which case other casting alloy metals, such as vanadium, nickel, tin, molybdenum, antimony, and the like may also be contained each with a content of from 0.01 to 0.06% by weight. The tensile strength, wear resistance and heat cracking resistance of the brake disks cast from such an alloy provide a very high service life of the brake disks which permits their use in utility vehicles.

12 Claims, No Drawings

OPTIMIZED GRAY CAST IRON PLATE ALLOY FOR UTILITY VEHICLE BRAKE DISKS

BACKGROUND AND SUMMARY OF THE INVENTION

The present invention relates to a gray cast iron plate alloy for brake disks, and more particularly to the use of such an alloy for brake disks of utility vehicles.

Disk brakes which are partially acted upon and made of gray cast iron are generally customary nowadays at least on the front wheels of passenger vehicles. The gray cast iron alloys used for this purpose are optimized with respect to comfort aspects, such as freedom from squealing and rubbing, because these aspect are dominant in the passenger car realm. The life expectancies of the brake disks are easily met by the alloys used in this field of application.

In utility vehicles, however, particularly with long-distance trucks or construction site vehicles, which are much heavier than passenger cars, the life expectancies are much higher than in the passenger car realm. In this case, a life in the range of several hundreds of thousands of kilometers is expected of a brake drum before a required replacement. As a rule, the service brakes of the utility vehicles are therefore constructed as drum brakes which have a much lower specific stress level in comparison to disk brakes. Inasmuch as disk brakes offer various advantages in comparison to drum brakes, disk brakes have recently been introduced in utility vehicle construction. If the alloy of the utility vehicle brake drums which also consist of gray cast iron were to be used in order to cast from it brake disks for utility vehicle disk brakes, the life expectancies existing for brake disks could not be met due to the higher stress levels.

In addition, because of the much higher thermal stressing of brake disks in comparison with brake drums, so-called "heat cracks" would also occur relatively early if the drum alloy were used for brake disks. Heat cracks are cracks which extend radially in the brake area and are initiated by repetitive high temperature stress and subsequent cooling and at first, that is, in small number and/or sizes of the cracks, are harmless. As the stress continues, the heat cracks increase in number, and existing heat cracks connect with others and expand radially. Thus, the heat cracks will, at some point, reach the exterior disk edge. If the brake disk were not at the latest repaired then, there would be the danger of a surface break out of the brake area or even complete disk breakage.

It is an object of the present invention to provide a gray cast iron plate alloy for brake disks which is optimized with respect to a higher service life and a reduced heat crack formation.

This object has been achieved according to the present invention by providing an alloy for a gray cast iron plate for casting blanks of brake disks, having the composition—in percent by weight—of 3.65 to 3.95%, preferably approximately 3.85% carbon,
0.20 to 0.40%, preferably approximately 0.30% chromium,
1.80 to 2.20% silicon,
0.60 to 0.80% manganese,
0.30 to 0.50% copper,
0.20 to 0.80%, preferably approximately 0.38 to 0.45% niobium, rests of iron, traces of other alloy metals and melting-caused impurities, such as phosphorus or sulfur.

The gray cast iron alloy according to the present invention is a high-carbon hypereutectic iron base material. Without the other alloy constituents, particularly niobium, a soft basic structure having an insufficient stability and hardness would occur due to the high carbon and silicon contents. The high carbon and silicon content provides, however, a good thermal conductivity of the casting material which, in turn, results in a reduction of the formation of heat cracks.

It should be noted that the relatively high carbon content is, among other things, paired with a specific moderate niobium content. As a result, despite the high carbon and silicon content, a complete and mainly finely lamellar, pearlitic basic structure is obtained. The latter is important for the high tensile strength and hardness.

According to the wall thickness of the brake disk (in the case of lower wall thicknesses, less; in the case of larger wall thicknesses, more), the silicon content is to be adjusted such that a Brinell hardness of approximately 150 to 190 HB is obtained and that the tensile strength is in the range of from 15 to 18 N/mm$^2$. In the fine-pearlitic basic structure, the niobium carbides are embedded in a uniformly distributed manner and reduce the wear during the braking operation. Also, a sufficiently good machinability is obtained of the cast alloy with the fine-pearlitic basic structure. The alloy constituents or contents of the present invention, in the combination described herein, provide a higher tensile strength, an increased resistance to wear and an also increased resistance to heat cracking than conventional brake disk alloys in gray cast iron plates.

It is important that, for use as a brake disk, the graphite carbon embedded in the cast structure is deposited in plate form because the plate form of graphite is much more advantageous for the tribological stressing of the brake disk than a ball shaped graphite. Thus, a nodular gray cast iron would not be suitable for a brake disk, also because of the increased danger of heat cracking, although this type of gray cast iron has a higher tensile strength and, at least in the bainitized condition, also a higher resistance to wear compared with the plate form gray cast iron. Alloys made of nodular gray cast iron were not previously known for the purpose of solving present usage and service life problems. In particular, prior art directed to passenger car brake disk alloys or drum brake alloys did not make this recognition.

DETAILED DESCRIPTION OF THE PREFERRED EMBODIMENT

An implemented example will now explain the invention. A hat-shaped ventilated brake disk was cast for an installation into a utility vehicle with a total permissible weight of 40 tons. The disk blank freed of circulating material weighed approximately 42 kg. The outside diameter of the disk blank measured approximately 450 mm. The individual walls in the disk area of the casting blank had a thickness of approximately 20 mm; the total thickness in the disk area of the casting blank measures approximately 55 mm. In addition to iron as well as traces of not listed alloy metals and impurities caused by the melting, such as phosphorus or sulfur, the alloy contained in percent by weight:

Carbon: 3.85%
chromium: 0.30%
silicon: 2.00%
manganese: 0.75%
copper: 0.40%
vanadium: 0.050%
niobium: 0.38%

Originally the alloy was melted in an electric furnace used as the test furnace. We have since learned, however, that an alloying process in a pouring ladle is also possible, thereby permitting the use of other furnaces. After the niobium was added in the electric furnace, the furnace was operated for approximately 25 minutes at a raised temperature (1,550° C.) with the niobium being dissolved as a result. The inoculants were 0.2% Sb5 as well as 0.5 kg treatment carbon in granulate form. The tensile strength of the sample bodies cast from the resultant alloy was 17 N/mm². Short-term wear tests on the brake test bench with brake disks produced from the indicated alloy demonstrated that the brake disk can be expected to have at least eight times the life of the brake pad linings.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An alloy for a gray cast iron plate for casting blanks of brake disks, consisting, by weight, in percent, of 3.65 to 3.95% of carbon;
0.20 to 0.40% of chromium;
1.80 to 2.20% of silicon;
0.60 to 0.80% of manganese;
0.30 to 0.50% of copper;
0.20 to 0.80% of niobium and iron.

2. The alloy according to claim 1, wherein the composition further consists of trace amounts of additional alloy metals and melting-caused impurities.

3. The alloy according to claim 1, further consisting of at least one additional casting alloy metal, vanadium, nickel, tin, molybdenum, and antimony, with a content of from 0.01 to 0.06% by weight per additional casting alloy metal, the total content of the at least one additional alloy metal being no greater than approximately 0.3% by weight.

4. The alloy according to claim 3, wherein the at least one additional casting alloy metal is selected from the group consisting of vanadium, nickel, tin, molybdenum and antimony.

5. A method of using an alloy, comprising the steps of:

formulating an alloy comprising, by weight, in percent, of
3.65 to 3.95% of carbon;
0.20 to 0.40% of chromium;
1.80 to 2.20% of silicon;
0.60 to 0.80% of manganese;
0.30 to 0.50% of copper;
0.20 to 0.80% of niobium and iron;

casting a gray cast iron plate from the alloy; and incorporating the cast iron plate into a utility vehicle brake disk.

6. A method of using an alloy, comprising the steps of:

formulating an alloy comprising, by weight, in percent, of
3.65 to 3.95% of carbon;
0.20 to 0.40% of chromium;
1.80 to 2.20% of silicon;
0.60 to 0.80% of manganese;
0.30 to 0.50% of copper;
0.20 to 0.80% of niobium and iron further including at least one additional casting alloy metal, vanadium, nickel, tin, molybdenum, and antimony, with a content of from 0.01 to 0.06% by weight per additional casting alloy metal, the total content of the at least one additional alloy metal being no greater than approximately 0.3% by weight;

casting a gray cast iron plate from the alloy; and incorporating the cast iron plate into a utility vehicle brake disk.

7. An alloy for a gray cast iron plate for casting blanks of brake disks, consisting, by weight, in percent; of approximately 3.85% of carbon;
approximately 0.30% of chromium;
1.80 to 2.20% of silicon;
0.60 to 0.80% of manganese;
0.30 to 0.50% of copper;
approximately 0.38 to 0.45% of niobium and iron.

8. The alloy according to claim 7, wherein the composition further consists of trace amounts of additional alloy metals and melting-caused impurities.

9. The alloy according to claim 7, further consisting of at least one additional casting alloy metal, vanadium, nickel, tin, molybdenum, and antimony, with a content of from 0.01 to 0.06% by weight per additional casting alloy metal, the total content of the at least one additional alloy metal being no greater than approximately 0.3% by weight.

10. The alloy according to claim 9, wherein the at least one additional casting alloy metal is selected from the group consisting of vanadium, nickel, tin, molybdenum and antimony.

11. A method of using an alloy, comprising the steps of:

formulating an alloy comprising, by weight, in percent, of
approximately 3.85% of carbon;
approximately 0.30% of chromium;
1.80 to 2.20% of silicon;
0.60 to 0.80% of manganese;
0.30 to 0.50% of copper;
approximately 0.38 to 0.45% of niobium and iron;

casting a gray cast iron plate from the alloy; and incorporating the cast iron plate in a utility vehicle brake disk.

12. The method of using an alloy according to claim 11, wherein the alloy further includes at least one additional casting alloy metal, vanadium, nickel, tin, molybdenum, and antimony, with a content of from 0.01 to 0.06% by weight per additional casting alloy metal, the total content of the at least one additional alloy metal being no greater than approximately 0.3% by weight.

* * * * *